United States Patent [19]
Morrison et al.

[11] Patent Number: 4,581,064
[45] Date of Patent: Apr. 8, 1986

[54] TREATMENT OF ANODE SLIMES IN A TOP BLOWN ROTARY CONVERTER

[75] Inventors: Bernard H. Morrison, Mississauga; John G. Lenz, Pierrefonds; Jacques Pageau, Montreal; J. Gerald Bard, Brossard, all of Canada

[73] Assignee: Noranda Inc., Toronto, Canada

[21] Appl. No.: 731,783

[22] Filed: May 8, 1985

[30] Foreign Application Priority Data

Jul. 4, 1984 [CA] Canada .................................. 458121

[51] Int. Cl.⁴ .............................................. C22B 15/00
[52] U.S. Cl. ........................................... 75/72; 75/73
[58] Field of Search ...................................... 75/72-76, 75/24, 25, 83, 60

[56] References Cited
U.S. PATENT DOCUMENTS

| | | | |
|---|---|---|---|
| 3,432,289 | 3/1969 | Spitz | 75/73 |
| 4,032,327 | 6/1977 | Donaldson | 75/72 |
| 4,073,646 | 2/1978 | Kryczun | 75/72 |

*Primary Examiner*—Peter D. Rosenberg
*Attorney, Agent, or Firm*—Fleit, Jacobson, Cohn & Price

[57] ABSTRACT

A process for treating anode slimes originating from copper, lead or nickel electrorefining to recover the precious metals contained therein is disclosed. The process comprises the steps of charging the slimes into a tiltable and rotatable top blown rotary converter (TBRC), smelting the slimes in the TBRC while it is rotated on an axis inclined to the horizontal to form a slag phase and a precious metals containing phase, tilting the TBRC and skimming the slag produced during smelting, and blowing an oxidizing gas onto or into the precious metals containing phase remaining in the TBRC while rotating the same on its axis inclined to the horizontal to remove impurity elements some of which enter a gas phase and some a new slag phase until a precious metals containing bullion suitable to be treated in a parting plant is obtained.

23 Claims, 1 Drawing Figure

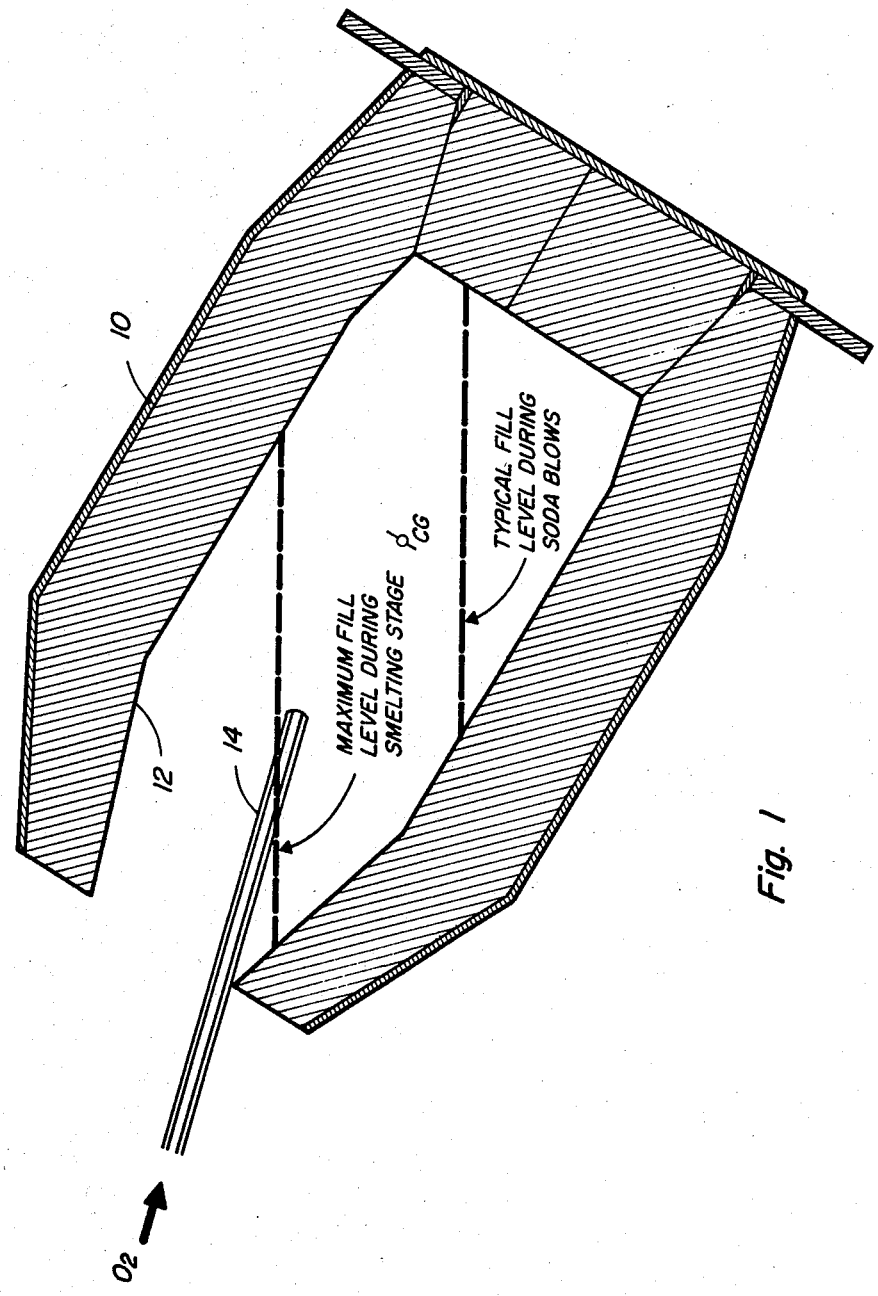

TREATMENT OF ANODE SLIMES IN A TOP BLOWN ROTARY CONVERTER

This invention relates to a process for treating anode slimes originating from copper, lead or nickel electrorefining to recover the precious metals contained therein. More particularly, the invention relates to a process for smelting, converting and partial refining, in a single vessel, of anode slimes resulting from the electrorefining of copper, lead or nickel anodes, and containing silver, gold, and platinum group precious metals, as well as deleterious elements including selenium, tellurium, lead, barium, silicon, copper, nickel, arsenic, antimony, sulphur, bismuth and other minor impurity elements.

Anode slimes are obtained during electrorefining of impure metal anodes, and are composed of elements and compounds not electrolytically oxidized, which are insoluble in the electrolyte. In copper electrorefining, for example, such slimes are composed of gold, silver and the platinum group precious metals, compounds of selenium and tellurium, as well as other compounds as $PbSO_4$. Preliminary processing of anode slimes usually involves a hydrometallurgical treatment to solubilize and partially separate such elements as Cu, Te, and Ni. Such processing involves treatment of the anode slimes with sulfuric acid at elevated temperatures and/or with elevated oxygen partial pressures. Following this leaching process, the insoluble precious metals containing residue, also called "decopperized slimes", is treated pyrometallurgically to produce a precious metals containing "doré" anode.

The treatment of decopperized slimes normally requires as a preliminary step, a roasting process to eliminate or significantly reduce the selenium content of the decopperized slimes. For example, at the copper refinery of Noranda Mines Limited, the decopperized slimes are pelletized with bentonite and roasted in a chain roaster at 815° C. At some other copper refineries, the decopperized slimes are roasted in a rotary kiln or in ductile iron trays in conventional roasters.

In some operations, the selenium roast precedes the decopperization leach; for example, water leached slimes are mixed with sulphuric acid and sodium sulphate and are heated in a rotary kiln under an air atmosphere to 650° C. or alternatively, slimes are mixed with concentrated sulphuric acid and baked in a specially designed batch or continuous multi-hearth roaster.

The preliminary slimes roasting process, or the deselenizing operation, is a significant cost factor in the upgrading of anode slimes to doré bullion, both in terms of operating and maintenance costs, and in terms of the precious metals tied up in the processing.

Following the deselenizing operation, the roasted slimes are smelted, together with any revert materials which arise during the precious metals processing, in a large rectangular reverberatory furnace, known as the Doré furnace. After melting down the charge and raising the slag temperature to the range 1300° to 1400° C., a so called "silica slag" is skimmed. The selenide matte phase which remains in the furnace is then blown with air, or oxygen enriched air using one or more submerged lances in order to oxidize impurities such as Pb, Se, and S, producing a so called "lead slag". Both the silica and lead slags are water insoluble, and the precious metals therein may be recovered by slag milling and flotation at minimal cost and environmental risk as described in U.S. Pat. No. 4,404,022 issued Sept. 13, 1983. Approximately 70% of the Se input of the Doré furnace, or ⅓ of the Se originally contained in the decopperized slimes, is volatilized in the Doré furnace and captured in wet scrubbers. The selenium, lead, tellurium and copper remaining in the silver bullion are then removed by refining with soda ash, while lancing with air, or oxygen enriched air, producing a soda slag containing typically 30% Se. The final refining is conducted with sodium nitrate (nitre) which serves primarily to oxidize the copper and tellurium contained in the silver bullion. The soda and nitre slags are water soluble, rendering precious metals recovery from these slags costly. The slags may be water leached, however the disposal or treatment of the sodium slags presents environmental problems. Alternatively, the soda and nitre slags may be returned to the copper smelting circuit, however the large amount of selenium contained in these slags would enter the copper and result in additional copper refining costs, and lowering of cathode purity.

Improvement to the above process, particularly with regards to impurity element elimination, is described in U.S. Pat. No. 3,902,890 issued Sept. 2, 1975. In the above patent, oxygen or oxygen enriched air is injected into the selenide matte to slag off the base metal impurities and oxidize selenium and tellurium. As a second step, oxidation is continued in the presence of a borosilicate flux (75% commercial borax and 25% silica) which was shown to be superior to either soda ash or sodium nitrate fluxes in the elimination of copper from the silver bullion.

The refined silver bullion is then cast into steel anode moulds and further refined in the electrolytic parting plant. A typical Doré furnace cycle requires about 48 hours, however, in some cases it can be as long as 20 days.

The shallow rectangular bath characteristics of the Doré furnace result in both economic and metallurgical inefficiencies. The large refractory area exposed to the precious metal bullion results in a high value of metals being absorbed into the refractory brickwork and tied-up for extended time periods. The use of fluxes in the Doré furnace is limited to those which produce very fluid slags, such as the fluxes based on sodium compounds. The use of metallurgical superior fluxes, such as $SiO_2$, is rendered difficult due to the poor fluidity of the slags so produced. Silica fluxed slags form sticky masses, adhering to the walls, preventing the slag from partaking in reactions with the metal.

The smelting of decopperized slimes in a short rotary furnace, as described in the TMS paper selection, Paper No. A82-12, entitled Selenium Recovery from Copper Electrolysis Slimes at Mitsubishi Osaka Refinery, by I. Fujimura and A. Katoi, produced by The Metallurgical Society of AIME in 1982, is a major advance over the Doré furnace process. The decopperized slimes are roasted in a short rotary furnace for 5 hours at 800° C. prior to smelting is the same vessel. Following smelting, the crude silver bullion is transferred to a second short rotary furnace for selective oxidation of impurity elements by blowing with air and fluxing with soda ash and nitre. The oxidation of the silver bullion is then finished in a third short rotary furnace with further additions of soda and nitre.

The short rotary furnace, while overcoming many of the above mentioned disadvantages of the Doré furnace and eliminating the need of a separate deselenizing roaster, can not practically convert the decopperized slimes to Doré silver bullion in a single vessel. The shape of the short rotary furnace, while ideal for roasting and smelting, is not well suited for blowing, and this problem is aggravated by the large volume reductions on converting the crude silver selenide matte to the final Doré silver bullion. The use of multiple short rotary furnaces results in increased operating and maintenance costs, as well as in greatly increased precious metals tie-ups.

Applicants have now found, in accordance with the present invention, that the smelting, converting and partial refining of anode slimes to recover the precious metals contained therein can be more effectively achieved by using a top blown rotary converter (TBRC), such as used for the autogenous smelting of lead in U.S. Pat. No. 4,008,075 issued Feb. 15, 1977, in place of the conventional Doré furnace or the short rotary furnace.

The shape of the TBRC is well suited for blowing, with high blowing efficiencies being maintained over a wide range of fill volumes, while at the same time, the TBRC retains the ability to roast and smelt the decopperized slimes as efficiently as the short rotary furnace. These properties allow for efficient single vessel treatment of the decopperized slimes to Doré grade silver bullion, which has not been achieved heretofor.

The process in accordance with the present invention, comprises the steps of charging the slimes into a top blown rotary converter (TBRC) rotating on an axis inclined to the horizontal; heating the slimes to a temperature sufficient to smelt the charge and form a slag and a precious metal containing phase; skimming the slag; and introducing an oxidizing gas such as air, oxygen enriched air, or commercially pure oxygen into the TBRC to remove impurity elements from the matte phase.

The drawing shows a typical TBRC vessel used in the present invention. The vessel is made of a fabricated steel shell 10 lined with a refractory material 12. The longitudinal axis of the vessel is at an angle with respect to the horizontal. The preferred orientation of the TBRC is to have the longitudinal axis of the vessel at an angle of 25° to 30° above the horizontal. The vessel is also tiltable about an axis perpendicular to its longitudinal axis to empty it when required. It is further preferable for the TBRC to rotate at a speed such as to result in an internal surface tangential velocity of between 5 cm/S to 25 cm/S. Heat is supplied to the TBRC with a burner (not shown) inserted through the mouth.

The initial step of the novel TBRC process is the smelting of the anode slimes to which revert materials can be added. If the revert materials being charged are high moisture filtration residues, it is preferable to feed these to the TBRC vessel prior to charging of the anode slimes in order to minimize the risk of explosions. Alternatively, the revert materials may be blended with the anode slimes. The anode slimes are charged to the TBRC vessel at a controlled rate so as to allow the anode slimes to tumble freely and continuously expose fresh surfaces as they are heated. This is advantageous in aiding and accelerating the volatilization of certain impurities, such as elemental selenium, contained in the anode slimes, and in uniformly heating the charge, thus accelerating the rate of melting. In treating anode slimes containing selenium, this rolling action during heating of the slimes, prior to melting, minimizes the amount of selenium reduced to the matte phase, and eliminates the need of prior treatment of the anode slimes in deselenizing roaster.

The anode slimes should be fed dry, or partially dried to under 10% moisture, to eliminate any risk of explosions. The anode slimes may be fed in an unagglomerated form, however it is preferable in terms of ease of charging and minimization of dusting to pelletize the anode slimes prior to charging.

In treating anode slimes resulting from the electrorefining of copper, such slimes are preferably decopperized using any conventional decopperizing process before being fed to the TBRC vessel. In heating to temperature above 950° C. in the TBRC vessel, the slimes are subjected to smelting whereby they separate into a slag and as silver selenide matte phase, the later phase being very fluid and containing practically all the precious metals. Depending on the composition of the slimes and revert materials, the slag phase typically contains a large amount of volatile lead compounds, and requires heating to temperatures of or above 1300° C. to become sufficiently fluid to allow skimming in the Doré furnace. Heating the slag to 1300° C. results in volatilization of a significant part of the lead, thereby contaminating the gas scrubber solutions with lead compounds, necessitating costly treatment of precipitated lead compounds in the scrubber. In the TBRC vessel, however, it is not absolutely necessary for the slag to be fluid prior to skimming. Because of the tiltability of the vessel, the large mouth and good accessibility to the interior of the furnace, the smelting slag can be removed by rabbling at temperatures below 1200° C., thereby reducing the volatilization of lead.

Following skimming of the smelting slag, further additions of slimes and revert materials may be made, thereby filling the working volume of the TBRC vessel with silver selenide matte.

After skimming of the smelting slag, the composition of the silver selenide matte is typically within the following ranges: Ag 50 to 60%, Pb 3 to 15%, Se 7 to 25%, Cu 0.8 to 4% and Te 0.7 to 1.5%. The impurity elements lead, selenium, tellurium, and to some extent copper, are then removed by oxidation with air, or oxygen enriched air, or commercially pure oxygen. It is understood that these terms refer to any suitable oxygen containing gas varying between 20 and 100% oxygen. The oxygen containing gas may be delivered to the matte phase either by surface blowing or submerged blowing, utilizing a refractory coated lance 14. The oxidizing gas may also be introduced through openings in the bottom of the vessel. The use of a rotatable vessel facilitates the oxidation process by: (1) the shape and rotation of the vessel continuously transport impurity elements to the point of oxygen addition; (ii) the rotation of the vessel causes intermixing of the slag and metal phases, enhancing the oxidation rate and the selectivity of the oxidation reactions; and (iii) the rotation of the vessel intermixes the flux and slag, thus accelerating the rate of flux reaction. The rotation of the vessel further results in a uniform refractory wear, thus prolonging the vessel life.

The impurity elements, on combining with the oxygen, may leave the matte phase by entering the gas phase, as is the case with selenium, or they may enter a slag phase, as is the case with lead and copper. The slag phase so produced is skimmed off several times during the course of converting of the silver selenide matte to Doré silver bullion. The elimination of certain impurity elements to the slag can be enhanced through the use of certain slag forming fluxes; however, it is to be understood that such fluxes are not necessary unless the refined Doré bullion is desired to be very low in impurity elements or unless a reduction in the degree of impurity element elimination to the gas phase is desired. The precious metal containing selenide matte may thus be oxidized in the presence of a silica flux primarily to remove lead from the matte or it may be oxidized in the presence of a sodium containing flux, such as soda ash, sodium carbonate, sodium borate or sodium nitrate.

The process of this invention is illustrated in the following examples.

EXAMPLE 1

Table I gives the TBRC process results on utilizing no added fluxes. In this example, the smelting slag was heated to about 1300° C. prior to skimming in order to produce a fluid smelting slag. The high smelting slag temperature, combined with the lack of a silica flux during converting resulted in a low degree of lead capture in the smelting and converting slags. Following skimming of the smelting slag, commercial grade oxygen was blown onto the surface of the selenide matte using an air cooled lance. The temperature was maintained between 1150 and 1250° C. The converting slags formed on oxygen lancing were skimmed at three regular intervals. The refined TBRC "Doré" bullion produced was very low in selenium, and reasonably low in copper, lead and tellurium, so that it could be directly treated in a parting plant.

EXAMPLE 2

To increase the degree of lead capture in the slags and enhance the impurity element elimination from the refined Doré bullion, certain slag forming fluxes are required. The effect of $SiO_2$ and $Na_2CO_3$ fluxes is illustrated in this example and Table II.

The revert materials and pelletized decopperized slimes were continuously charged into the rotating TBRC vessel until about ⅔ of the decopperized slimes were charged. The working volume of the TBRC vessel was filled at this point, and heating was continued until the slag temperature reached 1185° C. The smelting slag was skimmed, and the balance of the decopperized slimes were charged. The second smelting slag was also removed at 1185° C.

The silver selenide matte, which was kept in the vessel, was then blown with commercial oxygen using a refractory coated lance with the tip submerged beneath the metal level. The oxygen addition was divided into eight blows as follows: three converting blows, using 10 kg, 10 kg and 5 kg silica sand in each converting blow, one blow without flux, followed by four refining blows using approximately 6 kg sodium carbonate each. Slags were skimmed between the blows. The combination of the reduced smelting temperature and the use of silica flux increased the lead reporting to slags. The silica flux also reduced the lead in the refined bullion to a low level, while the soda flux assisted in the elimination of copper. The resulting bullion was entirely suitable for treatment in a parting plant.

TABLE I

TBRC PROCESS DECOPPERIZED SLIMES TREATMENT-NO ADDED FLUXES

|  | Weight kg | Composition → | Se | Cu | Ag + Au | Pb | Te |
|---|---|---|---|---|---|---|---|
| Input | | | | | | | |
| Decopperized Slimes | 529 | wt % | 15.8 | 1.9 | 29.5 | 14.2 | 1.02 |
| Outputs | | | | | | | |
| Smelting Slag (1300° C.) | 94 | wt % | | | 1.4 | 8.0 | |
| Converting Slag Composite | 52 | wt % | | 16 | 14 | 24 | |
| Scrubber Mud | 38.3 | wt % | 15.1 | 0.14 | 3.9 | 15 | |
| Scrubber Solution | — | kg | 46 | 0.02 | | | |
| Refined Dore Metal | 150 | wt % | <0.005 | 1.45 | 97.3 | 0.12 | 0.05 |

TABLE II

TBRC PROCESS MASS BALANCE

|  | Wt, kg | % of → | Ag + Au | Cu | Se | Pb | Te | SiO₂ |
|---|---|---|---|---|---|---|---|---|
| SMELTING | | | | | | | | |
| Inputs | | | | | | | | |
| Decopperized Slimes | 859.7 | wt % | 32.7 | 0.34 | 18.5 | 13.0 | 0.24 | 6.20 |
| Parting Plant Ppt. | 27.5 | wt % | 27.1 | 4.7 | | | | |
| Scrubber Mud | 59.9 | wt % | 12.0 | 0.08 | 11.4 | 35.0 | 0.58 | |
| Slag Concentrate | 80.7 | wt % | 34.3 | | 5.5 | 25.0 | 0.60 | 9.09 |
| High Grade Brick | 13.0 | | | | | | | |
| Output | | | | | | | | |
| Smelting Slag Composite | 257.3 | wt % | 1.61 | 0.15 | 0.20 | 29.0 | 0.04 | |
|  | | % dist. | 1.3 | 10 | 0.3 | 49 | 2.9 | |
| CONVERTING | | | | | | | | |
| Total SiO₂ Flux Used | 25 | | | | | | | |
| Converting Slag Composite | 110 | wt % | 7.60 | 1.17 | 0.70 | 21.7 | 0.19 | |
|  | | % dist. | 2.7 | 30 | 0.45 | 15.6 | 14.7 | |

TABLE II-continued

| | Wt, kg | % of → | Ag + Au | Cu | Se | Pb | Te | SiO$_2$ |
|---|---|---|---|---|---|---|---|---|
| REFINING | | | | | | | | |
| Total Na$_2$CO$_3$ Flux Used | 25 | | | | | | | |
| Refining Slag Composite | 22 | wt % | 4.50 | 3.15 | 0.23 | 2.38 | 0.92 | |
| | | % dist. | 0.3 | 16 | 0.03 | 0.3 | | 5.9 |
| SCRUBBER | | | | | | | | |
| Solution | 2500 l | g/l | 0.005 | 0.05 | 53 | 0.10 | 0.72 | |
| Mud | 110 | wt % | 5.9 | 0.04 | 33 | 34.5 | | |
| Total Scrubber Capture | | % dist. | 2.1 | 2 | 99 | 25 | 75 | |
| TBRC Dore Bullion | 304.2 | wt % | 99.2 | 0.70 | 0.005 | 0.0087 | <.002 | |
| | | % dist. | 93.2 | 50 | 0.01 | 0.01 | 0.00 | |

EXAMPLE 3

In terms of copper removal, the use of a sodiumborate flux (75% Borax, 25% SiO$_2$) has advantages over soda ash in the TBRC as is demonstrated in Table III. The test procedure was identical to the previous example, except a 75% borax, 25% silica flux was used instead of the soda ash. The copper in the refined silver bullion was reduced to 0.2%, compared with 0.7% when using the soda ash flux.

taining fluxes are considerably less than the amounts produced in the Doré furnace, varying from nil to about ⅔ of that produced in the Doré furnace. Further, all slags produced in the TBRC process are low in selenium, therefore little penalty would be incurred in terms of selenium contamination by returning these slags to the copper smelting circuit.

The applicants have also surprisingly found that a considerable advantage of the TBRC process over the Doré furnace process, in addition to the forementioned,

TABLE III

| | Wt, kg | % Of → | Ag + Au | Cu | Se | Pb | Te | SiO$_2$ |
|---|---|---|---|---|---|---|---|---|
| SMELTING | | | | | | | | |
| *Inputs* | | | | | | | | |
| Decopperized Slimes | 860.9 | wt % | 34.7 | 0.30 | 20.02 | 12.5 | 0.40 | 4.07 |
| Parting Plant Ppt. | 27.5 | wt % | 27.1 | 4.7 | | | | |
| Scrubber Mud | 59.9 | wt % | 12.0 | 0.08 | 11.4 | 35.0 | 0.58 | |
| Slag Concentrate | 80.7 | wt % | 34.3 | | 5.5 | 25.0 | | 9.09 |
| High Grade Brick | 13 | | | | | | | |
| *Output* | | | | | | | | |
| Smelting Slag Composite | 258.5 | wt % | 8.61 | 0.22 | 2.75 | 23.0 | 0.09 | |
| | | % dist. | 6.5 | 15.2 | 3.9 | 39.7 | 6.8 | |
| CONVERTING | | | | | | | | |
| Total SiO$_2$ Flux Used | 25 | | | | | | | |
| Converting Slag Composite | 110 | wt % | 6.16 | 0.78 | 0.55 | 26.5 | | |
| | | % dist. | 2.0 | 21.7 | 0.3 | 19.5 | | |
| REFINING | | | | | | | | |
| Total Borate Flux Used | 25 | | | | | | | |
| Refining Slag Composite | 39 | wt % | 24.9 | 11.1 | <.05 | 7.3 | 0.01 | |
| | | % dist. | 2.9 | +100 | 0.00 | 1.9 | 2.3 | |
| SCRUBBER | | | | | | | | |
| Solution | 2617 l | g/l | <.005 | 0.05 | 53 | 0.10 | 0.72 | |
| Scrubber Mud | 111 | wt % | 5.9 | 0.04 | 33 | 34.5 | | |
| Total Scrubber Capture | | % dist. | 2.0 | 6.5 | 95.8 | 25.7 | | |
| TBRC Dore Bullion | 289.6 | wt % | 99.6 | 0.21 | <.005 | <.005 | 0.003 | |
| | | % dist. | 84.3 | 15.2 | <.01 | <.01 | 0.2 | |

The process may also be modified by injecting oxygen during the smelting cycle. This is advantageous in accelerating the treatment time, and in increasing the smelting capacity of the TBRC.

The above example have illustrated that the TBRC process is capable of consistently producing refined silver bullion with under 50 ppm of selenium without requiring pre-treatment in a deselenizing roaster. The amounts of slags produced on fluxing with sodium containing fluxes are considerably less than the amounts resides in the reduction of the precious metals lock-up in the refractories. This is illustrated in the following Table IV comparing the precious metals lock-up in a Doré furnace to a TBRC vessel of equal smelting capacity of 24,000 kg per day of dexopperized slimes. This remarkable reduction in tie-up of precious metals is a result of not only the reduced surface area of the equivalent capacity TBRC but primarily due to the ability to seal the cracks and voids in the refractory surface by melting and coating the interior surface of the TBRC with a high melting iron containing slag such as slag from Noranda's continuous smelting and converting process or copper reverberatory furnace slag. This treatment is possible in the TBRC because of the ability to attain high operating temperatures and because the rotatability and tiltability of the TBRC allows all interior surfaces to be coated and sealed with the slag. The refractoriness of this slag sealant is enhanced by allowing oxidation of the slag, thereby converting the low melting point FeO contained in the slag to the higher melting point compound, $Fe_3O_4$. By filling all cracks and voids in the TBRC lining, the entry of the high value precious metals is prevented. Equivalent treatment is not practical in the stationary Doré furnace.

TABLE IV

PRECIOUS METAL TIE-UP IN THE DORE FURNACE AND TBRC PROCESSES

| | Dore Furnace Process | | | TBRC Process | |
|---|---|---|---|---|---|
| | Floor[1] | Walls[2] | Value[3] | Total | Value[3] |
| Surface Area $m^2$ | 6.5 | 26 | | 19.2 | |
| Lock-up Silver $kg/m^2$ | 980 | 90 | | 33.2 | |
| Total Silver, kg | 6370 | 2340 | $2,787,000 | 63.7 | $204,000 |
| Lock-up Gold $kg/m^2$ | 22.1 | 2.1 | | 0.7 | |
| Total Gold, kg | 144 | 55 | $2,546,000 | 13 | $167,000 |
| TOTAL | | | $5,333,000 | | $371,000 |

[1]Nucon-60 brick
[2]CRB-20 Brick
[3]Based on Can $320/kg Ag, Can $12,860/kg Au

It should be understood that the invention is not limited to the specifically described and examplified embodiments and that many modifications obvious to those skilled in the art can be introduced without departing from the spirit of the invention and the scope of the following claims.

1. A process for the separation of deleterious elements such as selenium, tellurium, lead, bismuth, arsenic, silicon, nickel, sulphur, antimony and copper from anode slimes originating from copper, lead or nickel electrorefining, and treatment of said anode slimes to recover the precious metals contained therein, comprising the steps of;
   (a) charging the slimes into a top blown rotary converter (TBRC) rotating on an axis inclined to the horizontal;
   (b) heating the slimes to a temperature sufficient to smelt the charge and causing formation of a precious metal phase containing substantially all of the silver, gold and platinum group metals as well as minor amounts of impurity elements, such as selenium, tellurium, lead, copper, bismuth, arsenic, antimony, nickel, and other noble elements, and formation of a smelting slag phase containing less noble elements such as silicon and substantial quantities of lead;
   (c) skimming the smelting slag; and
   (d) introducing an oxidizing gas, such as air, oxygen enriched air, or commercially pure oxygen into the TBRC to remove from the precious metal containing phase those elements less noble than the precious metals, such as selenium, tellurium, lead, copper, bismuth, arsenic, antimony and nickel, thereby concentrating the precious metals in a form suitable for parting of silver, gold and other platinum group metals.

2. A process as defined in claim 1, wherein revert materials are also added to the charge.

3. A process as defined in claim 2, wherein the revert materials are fed to the TBRC prior to charging of the slimes.

4. A process as defined in claim 2, wherein the revert materials are blended with the slimes.

5. A process as defined in claim 1, wherein the slimes are charged into the TBRC at a controlled rate so as to allow the slimes to tumble freely and continuously expose fresh surfaces as they are heated, thereby aiding and accelerating the evolution of the volatile elements, thus minimizing their recovery to the precious metals phase.

6. A process as defined in claim 1, wherein the slimes are dried to at least 10% moisture prior to beint fed to the TBRC.

7. A process as defined in claim 1, wherein the slimes are fed to the TBRC in an unagglomerated form.

8. A process as defined in claim 1, wherein the slimes are pelletized prior to charging into the TBRC.

9. A process as defined in claim 1, wherein the slimes are those resulting from the electrorefining of copper and contain substantial quantities of selenium, and wherein the slimes are subjected to smelting at a temperature above 950° C. under continuous rotation, thereby exposing new surfaces and maximizing selenium volatilization; thereby separating a large portion of the selenium to the gas phase and separating the liquid charge remaining in the furnace into a smelting slag and a silver selenide matte phase, the latter containing practically all the precious metals, and wherein the smelting slag is then skimmed out of the TBRC.

10. A process as defined in claim 9, wherein the TBRC is tiltable and wherein the slimes are heated to a temperature below 1200° C. and the TBRC tilted to allow skimming of the smelting slag produced by rabbling prior to complete fluidizing thereby reducing volatilization of lead.

11. A process as defined in claim 1, wherein the oxidizing gas is introduced by surface blowing or submerged blowing utilizing a refractory coated lance.

12. A process as defined in claim 1, wherein the oxidizing gas is introduced through openings in the bottom of the TBRC.

13. A process as defined in claim 1, wherein some impurity elements leave the precious metals containing phase by entering a gas phase, whereas other impurity elements leave the precious metals containing phase by entering into a slag phase which is skimmed off several times during the course of oxidation of the precious metals containing phase.

14. A process as defined in claim 13, wherein the elimination of certain impurity elements to the slag phase is enhanced through the use of slag forming fluxes.

15. A process as defined in claim 13, wherein the precious metals containing phase is oxidized in the presence of a $SiO_2$ flux, primarily to remove lead from said phase.

16. A process as defined in claim 13, wherein the precious metals containing phase is oxidized in the presence of a sodium containing flux, such as soda ash, sodium carbonate, sodium borate and sodium nitrate.

17. A process as defined in claim 1, wherein an oxidizing gas is also injected during the smelting cycle to accelerate the treatment time.

18. A process as defined in claim 1, wherein, in order to reduce a precious metals lock-up in the TBRC, the TBRC is subjected to a prior melting therein of a high melting temperature slag for coating of the interior surfaces of the vessel, thereby filling all cracks and voids in its refractory lining with said slag.

19. A process as defined in claim 18, wherein the slag, is an iron containing slag.

20. A process as defined in claim 18, wherein the iron containing slag is allowed to oxidize in the TBRC, thereby increasing the slag refractoriness through conversion of FeO to $Fe_{O4}$.

21. A process for the separation of deleterious elements such as selenium, tellurium, lead, bismuth, arsenic, silicon, nickel, sulphur, antimony and copper from anode slimes originating from copper, lead or nickel electrorefining, and treatment of said anode slimes to recover the precious metals contained therein, comprising the steps of:
    (a) charging the slimes into a tiltable and rotatable top blown rotary converter (TBRC);
    (b) heating the slimes in said TBRC while it is rotated on an axis inclined to the horizontal to a temperature sufficient to smelt the charge and causing formation of a precious metal phase containing substantially all of the silver, gold and platinum group metals as well as minor amounts of impurity elements, such as selenium, tellurium, lead, copper, bismuth, arsenic, antimony, nickel, and other noble elements, and formation of a smelting slag phase containing less noble elements, such as silicon and substantial quantities of lead;
    (c) tilting the TBRC and skimming the slag produced during smelting; and
    (d) blowing an oxidizing gas onto or into the precious metals containing phase remaining in the TBRC while rotating the same on its axis inclined to the horizontal to remove from the precious metals containing phase those elements less noble than the precious metals, such as selenium, tellurium, lead, cooper, bismuth, arsenic, antimony and nickel, thereby concentrating the precious metals in a form suitable for electrolytic parting of silver, gold and other platinum group metals.

22. A process as defined in claim 21, wherein the blowing is carried out by a plurality of blows, with addition of suitable fluxes and with skimming of the produced slag between the blows and at the end of the blowing operation.

23. A process as defined in claim 21, wherein the in order to reduce a precious metals lock-up in the TBRC, the TBRC is subjected to a prior melting therein of a high melting temperature slag for coating of the interior surfaces of the vessel, thereby filling all cracks and voids in its refractory lining with said flag.

* * * * *